United States Patent
Iwasaki (10) Patent No.: US 8,244,239 B2
(45) Date of Patent: Aug. 14, 2012

(54) COMMUNICATION APPARATUS, COMMUNICATION METHOD, PROGRAM, AND COMMUNICATION SYSTEM

(75) Inventor: Jun Iwasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 262 days.

(21) Appl. No.: 12/652,504

(22) Filed: Jan. 5, 2010

(65) Prior Publication Data

US 2010/0173583 A1 Jul. 8, 2010

(30) Foreign Application Priority Data

Jan. 6, 2009 (JP) ................ P2009-001157

(51) Int. Cl.
*H04W 4/00* (2009.01)

(52) U.S. Cl. .............. 455/432.3; 455/456.1; 455/566; 709/227

(58) Field of Classification Search ........... 455/432.3, 455/456.1, 566, 353, 67.11; 725/14.73, 32; 709/227

See application file for complete search history.

(56) References Cited

U.S. PATENT DOCUMENTS

| | | | |
|---|---|---|---|
| 7,403,914 B2 * | 7/2008 | Janakiraman et al. | 709/227 |
| 7,631,327 B2 * | 12/2009 | Dempski et al. | 725/34 |
| 8,055,184 B1 * | 11/2011 | DiMartino et al. | 455/1 |
| 2009/0254529 A1 * | 10/2009 | Goldentouch | 707/3 |
| 2010/0063644 A1 * | 3/2010 | Kansal et al. | 700/295 |
| 2010/0216458 A1 * | 8/2010 | Cai et al. | 455/432.3 |
| 2011/0151890 A1 * | 6/2011 | Platt et al. | 455/456.1 |
| 2011/0177829 A1 * | 7/2011 | Platt et al. | 455/456.2 |

FOREIGN PATENT DOCUMENTS

| | | |
|---|---|---|
| JP | 2002-268776 | 9/2002 |
| JP | 2006-60283 | 3/2006 |
| JP | 2007-081551 | 3/2007 |

* cited by examiner

*Primary Examiner* — Minh D Dao (74) *Attorney, Agent, or Firm* — Finnegan, Henderson, Farabow, Garrett & Dunner, L.L.P.

(57) ABSTRACT

A communication apparatus is provided including a display unit, a storage unit capable of storing therein display condition information in which a display instruction for causing the display unit to perform display processing or a non-display instruction for not allowing the display unit to perform the display processing is set, and a short distance wireless communication control unit for controlling a connection establishment communication with a communication party by a communication system based on electric field coupling or magnetic field coupling and data communication with the communication party by the communication system. The short distance wireless communication control unit judges whether the non-display instruction is set in the display condition information stored in the storage unit, and does not make the data communication with the communication party when judging that the non-display instruction is set, the communication control unit.

7 Claims, 5 Drawing Sheets

COMMUNICATION APPARATUS, COMMUNICATION METHOD, PROGRAM, AND COMMUNICATION SYSTEM

BACKGROUND OF THE INVENTION

1. Field of the Invention

The present invention relates to a communication apparatus, a communication method, a program, and a communication system.

2. Description of the Related Art

In recent years, there has been broadly used a radio wave communication system specified in the IEEE (Institute of Electrical and Electronic Engineers) 802.11. In the radio wave communication system, an antenna is used to transmit and receive wireless radio waves, but there has been a case where the wireless radio waves interfere with radio waves transmitted or received therearound, which have harmful effects on the communication.

Moreover, there is proposed a short distance wireless communication system which uses electric field coupling or magnetic field coupling to make a communication, other than the radio wave communication system. In the short distance wireless communication system, for example, when a plurality of communication apparatuses for performing magnetic field coupling are brought close to each other, the communication apparatuses are magnetically coupled and communication between the communication apparatuses is realized by the magnetic field coupling. In this manner, according to the short distance wireless communication system based on electric field coupling or magnetic field coupling, since signals are not transmitted if a communication party is not in proximity, the issue for the interference is not likely to occur, which is more advantageous than the radio wave communication system.

SUMMARY OF THE INVENTION

Here, in the short distance wireless communication system based on electric field coupling or magnetic field coupling, since communication starts by proximity of two communication apparatuses, there has been an issue that one of the communication apparatuses receives data from another communication apparatus not intended as a communication party. Moreover, there has been an issue that one of the communication apparatuses is robbed of data by a communication apparatus not intended as a communication party.

Then, the present invention has been made in view of the above issues, and it is desirable to provide a novel and improved technology capable of restricting a communication party of data communication based on electric field coupling or magnetic field coupling, while reducing development costs.

According to an embodiment of the present invention, there is provided a communication apparatus including a display unit, a storage unit capable of storing therein display condition information in which a display instruction for causing the display unit to perform display processing or a non-display instruction for not allowing the display unit to perform the display processing is set, a display control unit for causing the display unit to perform the display processing when the display instruction is set in the display condition information stored in the storage unit and for not allowing the display unit to perform the display processing when the non-display instruction is set in the display condition information, and a communication control unit for controlling a connection establishment communication with a communication party by a communication system based on electric field coupling or magnetic field coupling and data communication with the communication party by the communication system. More specifically, when receiving signals transmitted from the communication party at the time of the connection establishment communication, the communication control unit judges whether the non-display instruction is set in the display condition information stored in the storage unit, and when judging that the non-display instruction is set, the communication control unit does not make the data communication with the communication party.

In the display condition information, there may be set any one of the display instruction, the non-display instruction, and a low-power-consumption display instruction for causing display processing in low power consumption mode using less power than that consumed in the display processing when the display instruction is set, and the display control unit, when the low-power-consumption display instruction is set in the display condition information stored in the storage unit, may cause the display unit to perform the display processing in the low power consumption mode, and the communication control unit may judge whether the non-display instruction or the low-power-consumption display instruction is set in the display condition information stored in the storage unit, and when judging that the non-display instruction or the low-power-consumption display instruction is set, the communication control unit may not make the data communication with the communication party.

The communication apparatus may further include an operation unit capable of receiving input of a display suspension instruction for suspending the display processing or a display restart instruction for restarting the display processing, and a display condition switch unit for setting the non-display instruction in the display condition information stored in the storage unit when the operation unit receives input of the display suspension instruction, and for setting the display instruction for the display condition information stored in the storage unit when the operation unit receives input of the display restart instruction.

The storage unit may further store therein a threshold value, and the display condition switch unit may measure an elapsed time since the last time the operation unit received the input of operation information from a user, and may set the non-display instruction in the display condition information stored in the storage unit when the elapsed time exceeds the threshold value.

According to the embodiments of the present invention described above, it is possible to restrict a communication party of data communication based on electric field coupling or magnetic field coupling, while suppressing development costs.

DETAILED DESCRIPTION OF THE EMBODIMENT

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

"Detailed Description of the Embodiment" will be described in the following order.

[1] Outline of the present embodiment
[2] How the present embodiment has been made
[3] Detailed description of the present embodiment
[3-1] Hardware configuration of cell phone
[3-2] Function of cell phone
[3-3] Operation of cell phone
(Operation example)
[4] Conclusion

[1] Outline of the Present Embodiment

First, an outline of a communication system 1 according to an embodiment of the present invention will be described with reference to FIG. 1.

Figure 1:
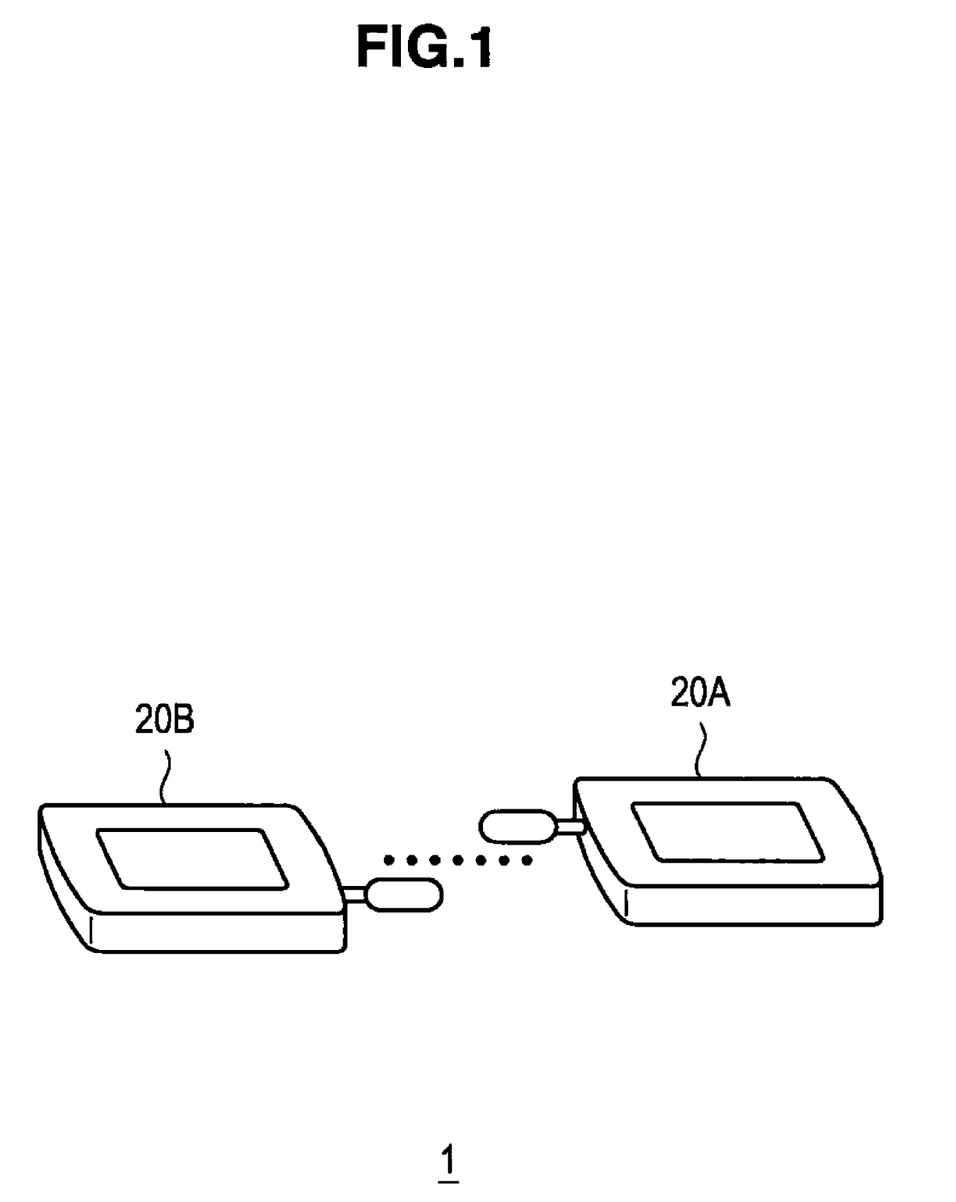
FIG. 1 is an explanatory diagram showing a communication system according to an embodiment of the present invention.

FIG. 1 is an explanatory diagram showing the communication system 1 according to the embodiment of the present invention. As shown in FIG. 1, the communication system according to the present embodiment consists of a pair of cell phones 20A and 20B (communication apparatuses). Each of the cell phones 20A and 20B includes an electrode plate called electric field coupler capable of electric field coupling with each other. When the electric field couplers of both of the cell phones 20A and 20B are brought close to each other within 3 cm, for example, a change in an induction electric field generated by one electric field coupler is sensed by the other electric field coupler, and thereby electric field communication between the cell phones 20A and 20B can be realized.

More specifically, out of the pair of devices for making electric field communication described above, one functions as an initiator and the other functions as a responder. The initiator makes a connection establishment request and the responder receives the connection establishment request from the initiator.

For example, when the cell phone 20B shown in FIG. 1 functions as an initiator and the cell phone 20A functions as a responder, and the cell phones 20A and 20B are brought close to each other, the cell phone 20A receives a connection establishment request transmitted from the cell phone 20B. Then, when the connection establishment request is received by the cell phone 20A, the cell phones 20A and 20B perform authentication processing as one example of connection establishment processing, and when the authentication processing is normally terminated, the cell phones 20A and 20B are connected to each other in a data communicable state. The authentication processing is, for example, a confirmation as to whether software versions or emulation systems indicating the included protocol are coincided between the cell phones 20A and 20B.

Thereafter, the cell phones 20A and 20B perform data communication on a one-to-one basis. More specifically, the cell phone 20B transmits arbitrary data to the cell phone 20A by the electric field coupler. Alternatively, the cell phone 20A transmits arbitrary data to the cell phone 20B by the electric field coupler. The arbitrary data is, for example, audio data such as music, lecture or radio program, video data such as movie, TV program, video program, photograph, document, picture and graphic, or game and software.

Since the intensity of the induced electric field generated from such an electric field coupler is inversely proportional to the fourth power of the distance, whereas radio waves emitted from an antenna are attenuated in inverse proportion to the square of the distance, it is advantageous in that the distance within which electric field communication between the pair of cell phones 20 is possible can be restricted. In other words, the electric field communication can provide benefits that deterioration of signals due to surrounding obstacles rarely occurs and a technology for preventing hacking or for securing concealment can be simplified.

Moreover, radio waves emitted from an antenna have transversal components oscillating in a direction orthogonal to the wave traveling direction and have polarization. In contrast to this, since the electric field coupler has longitudinal components oscillating in the traveling direction and generates an induction electric field which does not have polarization, it is also convenient in that the reception side can receive signals if the faces of the pair of electric field couplers are opposed to each other.

In addition, in the present specification, description will be made with emphasis on an example in which the pair of cell phones 20 utilize electric field couplers to make a short distance wireless communication (non-contact communication), but the present invention is not limited thereto. For example, the pair of cell phones 20 can also make a short distance wireless communication via communication units communicable by magnetic filed coupling. Further, the cell phones 20A and 20B can also make a telephone communication or e-mail communication.

Furthermore, the cell phones 20A and 20B are merely shown as one example of the communication apparatus, in FIG. 1, and the preset invention is not limited thereto. For example, the communication apparatus may be an information processing device such as PC (personal computer), home video processing device (such as DVD recorder or video cassette recorder), cell phone, PHS (personal handyphone system), portable music player, portable video processing device, PDA (personal digital assistants), home game device, portable game device or household electrical appliance.

[2] How the Present Embodiment has been Made

As described above, in the short distance wireless communication, data communication between the pair of cell phones 20A and 20B starts by proximity of the cell phones 20A and 20B. Accordingly, in the short distance wireless communication, while user's convenience can be improved, it is expected that data communication unintended by a user would be made.

For example, there was an issue that when a user in a crowded train has a cell phone related to the present embodiment, the cell phone of the user and a cell phone of a third party got close to each other and data in the cell phone of the third person was sent into the cell phone of the user, without the user knowing it. Alternatively, there was an issue that the data in the cell phone of the user was obtained by the cell phone of the third party, without the user knowing it.

Thus, the cell phone 20 according to the present embodiment has been made in view of the above circumstances. The cell phone 20 according to the present embodiment can prevent data communication unintended by a user from being performed. The cell phone 20 according to the present embodiment will be described below in detail.

[3] Detailed Description of the Present Embodiment

[3-1] Hardware Configuration of Cell Phone

First, a hardware configuration of the cell phone 20 according to the present embodiment will be described with reference to FIG. 2.

Figure 2:
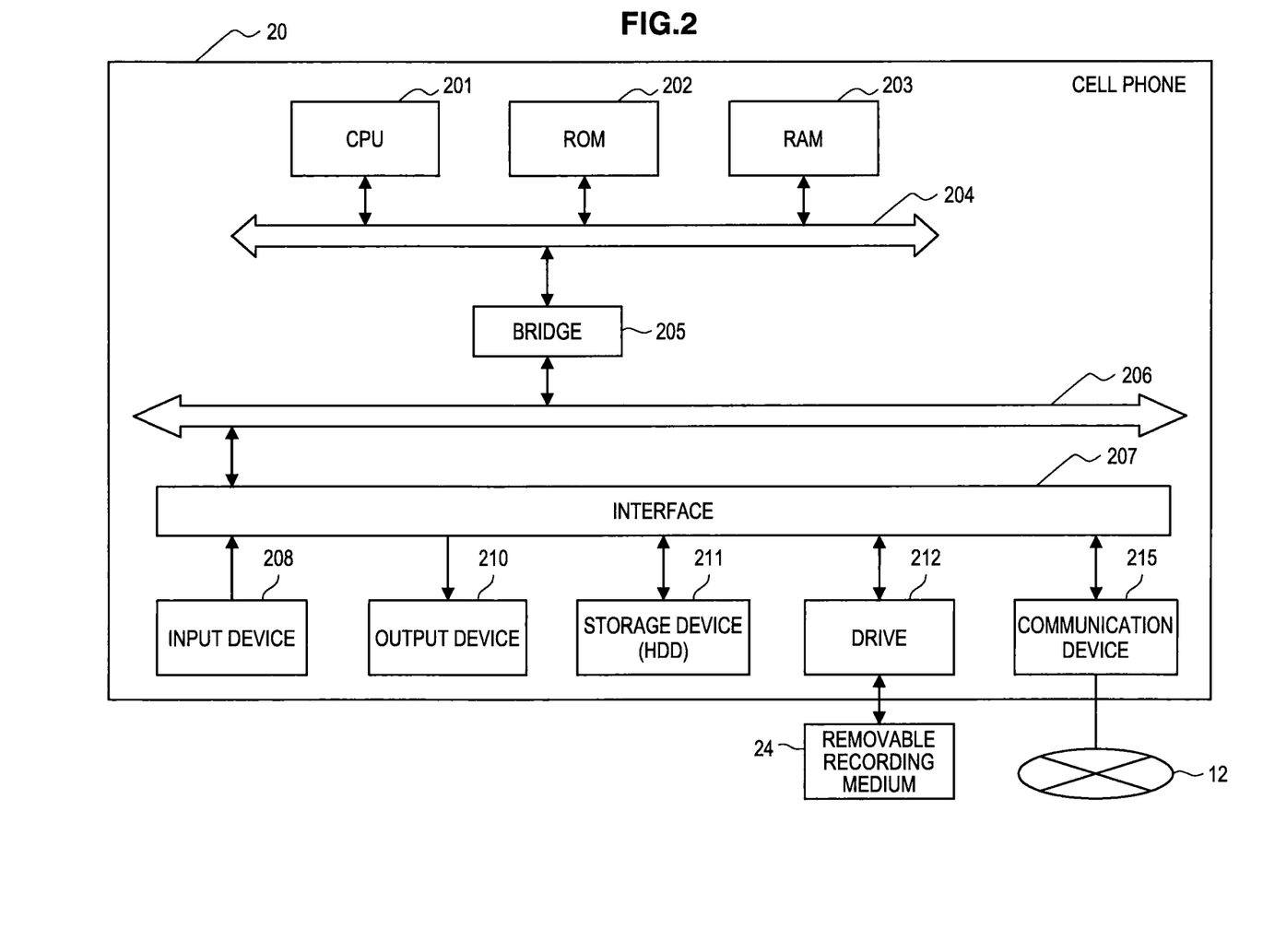
FIG. 2 is a block diagram showing a hardware configuration of a cell phone.

FIG. 2 is a block diagram showing the hardware configuration of the cell phone 20. The cell phone 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212 and a communication device 215.

The CPU 201 functions as an arithmetic processing device and a control device, and controls the entire operation within the cell phone 20 according to various types of programs. Moreover, the CPU 201 may be a microprocessor. The ROM 202 stores therein programs, calculation parameters and the like used by the CPU 201. The RAM 203 primarily stores therein programs used by the CPU 201, parameters appropriately changing in the execution, and the like. These are interconnected via the host bus 204 including a CPU bus and the like.

The host bus 204 is connected to the external bus 206 such as PCI (Peripheral Component Interconnect/Interface) bus via the bridge 205. In addition, the host bus 204, the bridge 205 and the external bus 206 are not necessarily configured separately and the functions thereof may be mounted on one bus.

The input device 208 includes an input means for inputting information by a user such as mouse, keyboard, touch panel, button, microphone, switch and lever, and an input control circuit for generating an input signal and outputting the same to the CPU 201 based on the input by the user. The user of the cell phone 20 can input various types of data and give an instruction for performing processing operation to the cell phone 20 by operating the input device 208.

The output device 210 includes a display device such as CRT (Cathode Ray Tube) display device, liquid crystal display (LCD) device, OLED (Organic Light Emitting Display) device and lamp, and an audio output device such as speaker and headphone. The output device 210 outputs reproduced contents, for example. Specifically, the display device displays various types of information such as reproduced video data in the form of text or image. On the other hand, the audio output device converts reproduced audio data into audio and outputs the same.

The storage device 211 is a device for data storage. The storage device 211 may include a storage medium, a recording device for recording data in the storage medium, a reading device for reading out the data from the storage medium, and a deletion device for deleting the data recorded in the storage medium. The storage device 211 includes a HDD (Hard Disk Drive), for example. This storage device 211 drives the hard disk and stores therein the programs performed by the CPU 201 or various types of data.

The drive 212 is a reader/writer for storage medium and is built into or attached outside the cell phone 20. The drive 212 reads out the information recorded in a removable recording medium 24 attached thereto such as magnetic disk, optical disk, magnetooptical disk, or semiconductor memory, and outputs the same to the RAM 203.

The communication device 215 is a communication interface including a communication device for connecting to a communication network 12, for example. Specifically, the communication device 215 corresponds to a device such as antenna (antenna 42 in FIG. 3) or wireless chip for making telephone communication and e-mail communication, and an electric field coupler (electric field coupler C in FIG. 3) for making short distance wireless communication.

[3-2] Function of Cell Phone

The hardware configuration of the cell phone 20 according to the present embodiment has been described with reference to FIG. 2 hereinabove. Subsequently, the function of the cell phone 20 will be described with reference to FIG. 3 to FIG. 6.

Figure 3:
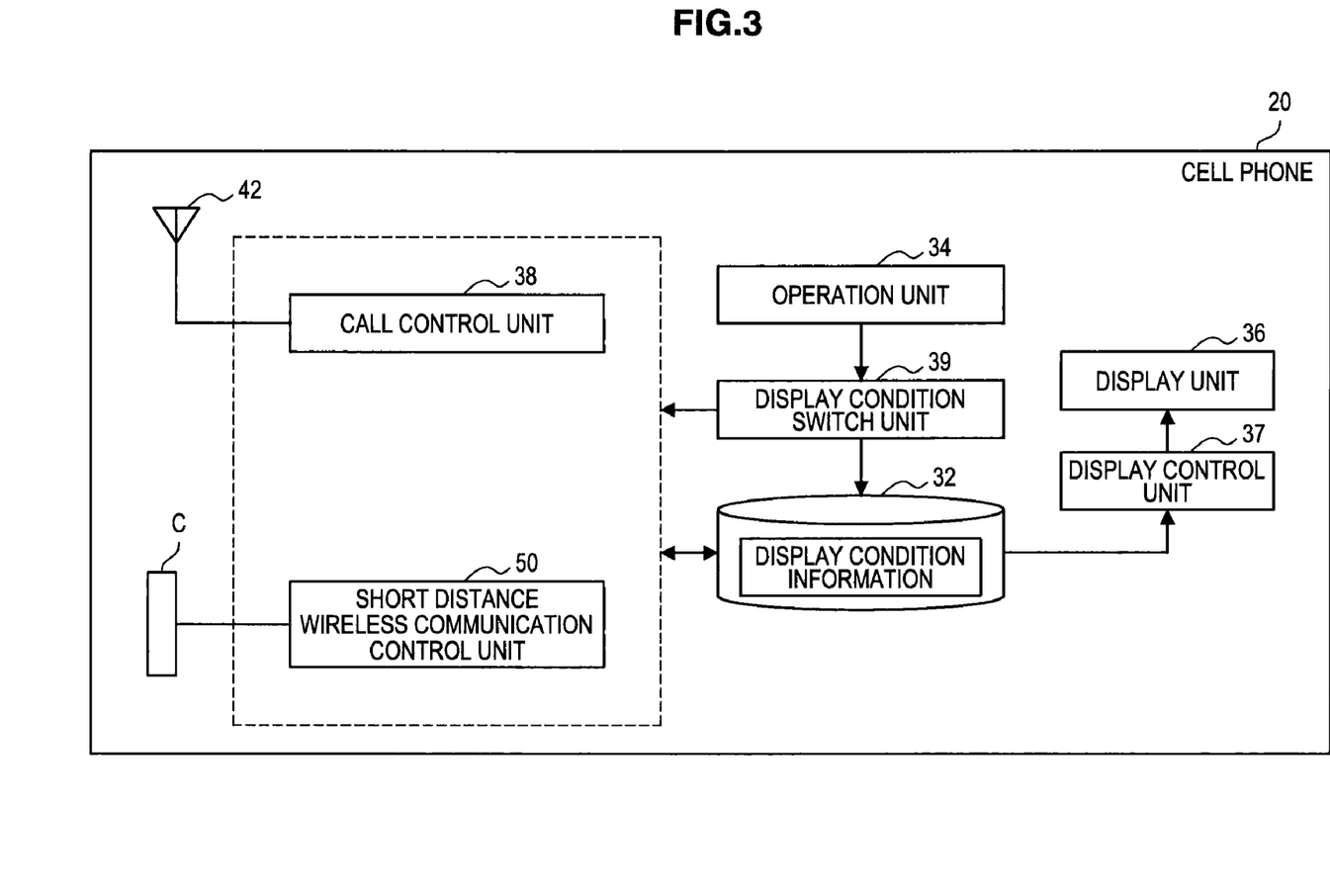
FIG. 3 is a functional block diagram showing a configuration of the cell phone according to the present embodiment.

FIG. 3 is a functional block diagram showing a configuration of the cell phone 20 according to the present embodiment. As shown in FIG. 3, the cell phone 20 according to the present embodiment includes a storage unit 32, an operation unit 34, a display unit 36, a call control unit 38, an antenna 42, a short distance wireless communication control unit 50, an application 60, and an electric field coupler C.

The storage unit 32 is a storage device for storing therein received data and the like. Moreover, the storage unit 32 can store display condition information in which a display instruction for causing the display unit 36 to perform display processing or a non-display instruction for not allowing the display unit 36 to perform display processing is set. The storage unit may further store a threshold value.

For the display condition information, there may be set any one of the display instruction, the non-display instruction, and a low-power-consumption display instruction for causing display processing in low power consumption mode. The low power consumption mode means a mode using less power than used in display processing when the display instruction is set.

In addition, the storage unit 32 may be a storage medium which is, for example, a non-volatile memory such as EEPROM (Electrically Erasable Programmable Read-Only Memory) and EPROM (Erasable Programmable Read Only Memory), a magnetic disk such as hard disk and disk-shaped magnetic disk, an optical disk such as CD-R (Compact Disc Recordable)/RW (ReWritable), DVD-R (Digital Versatile Disc Recordable)/RW/+R/+RW/RAM (Random Access Memory) and BD (Blu-Ray Disc (registered trademark)-R/BD-RE, or a MO (Magneto Optical) Disk.

The operation unit 34 (e.g., corresponding to the input device 208 shown in FIG. 2) is an interface between the cell phone 20 and the user. The user can input various types of data or various instructions into the cell phone 20 by operating the operation unit 34. Moreover, the operation unit 34 can receive input of a display suspension instruction for suspending display processing or a display restart instruction for restarting display processing.

The display unit 36 (e.g., corresponding to the output device 210 shown in FIG. 2) displays a screen according to the user's operation to the operation unit 34 or displays a screen indicating a caller at the time of incoming call.

A display control unit 37 causes the display unit 36 to perform display processing when the display instruction is set in the display condition information stored in the storage unit 32. Moreover, the display control unit 37 does not allow the display unit 36 to perform display processing when the non-display instruction is set in the display condition information. Here, the display processing is, for example, to display target data stored in the storage unit 32 on the display unit 36.

Moreover, the display control unit 37 may cause the display unit 36 to perform display processing in low power consumption mode when the low-power-consumption display instruction is set in the display condition information stored in the storage unit 32.

The call control unit 38 controls telephone communication with another communication apparatus. For example, the call control unit 38 converts user's voice data obtained by a microphone into a form transmittable from the antenna 42, and transmits the converted data from the antenna 42 to another communication apparatus. Furthermore, the call control unit 38 demodulates and decodes the voice data received by the antenna 42.

A display condition switch unit 39 sets the non-display instruction for the display condition information stored in the storage unit 32 when the operation unit 34 receives input of the display suspension instruction. Moreover, the display condition switch unit 39 sets the display instruction for the display condition information stored in the storage unit 32 when the operation unit 34 receives input of the display restart instruction.

The display condition switch unit 39 may measure an elapsed time since the last time the operation unit 34 received an input of operation information by the user. In this case, the display condition switch unit 39 may set the non-display instruction for the display condition information stored in the storage unit 32 when the elapsed time exceeds the threshold value.

The antenna 42 is an interface with another communication apparatus, and receives audio data transmitted from another communication apparatus by electromagnetic waves and transmits audio data to another communication apparatus by electromagnetic waves.

The electric field coupler C functions as a communication unit for making communication based on electric field coupling with the electric field coupler of a communication apparatus in proximity, as described in "[1] Outline of the present embodiment."

The short distance wireless communication control unit 50 functions as a communication control unit for controlling short distance wireless communication (communication system) based on electric field coupling with another communication apparatus. For example, the short distance wireless communication control unit 50 transmits data provided from the application 60 from the electric field coupler C, or provides the data received by the electric field coupler C to the storage unit 32. Hereinafter, the function of the short distance wireless communication control unit 50 will be described in detail with reference to FIG. 4.

Figure 4:
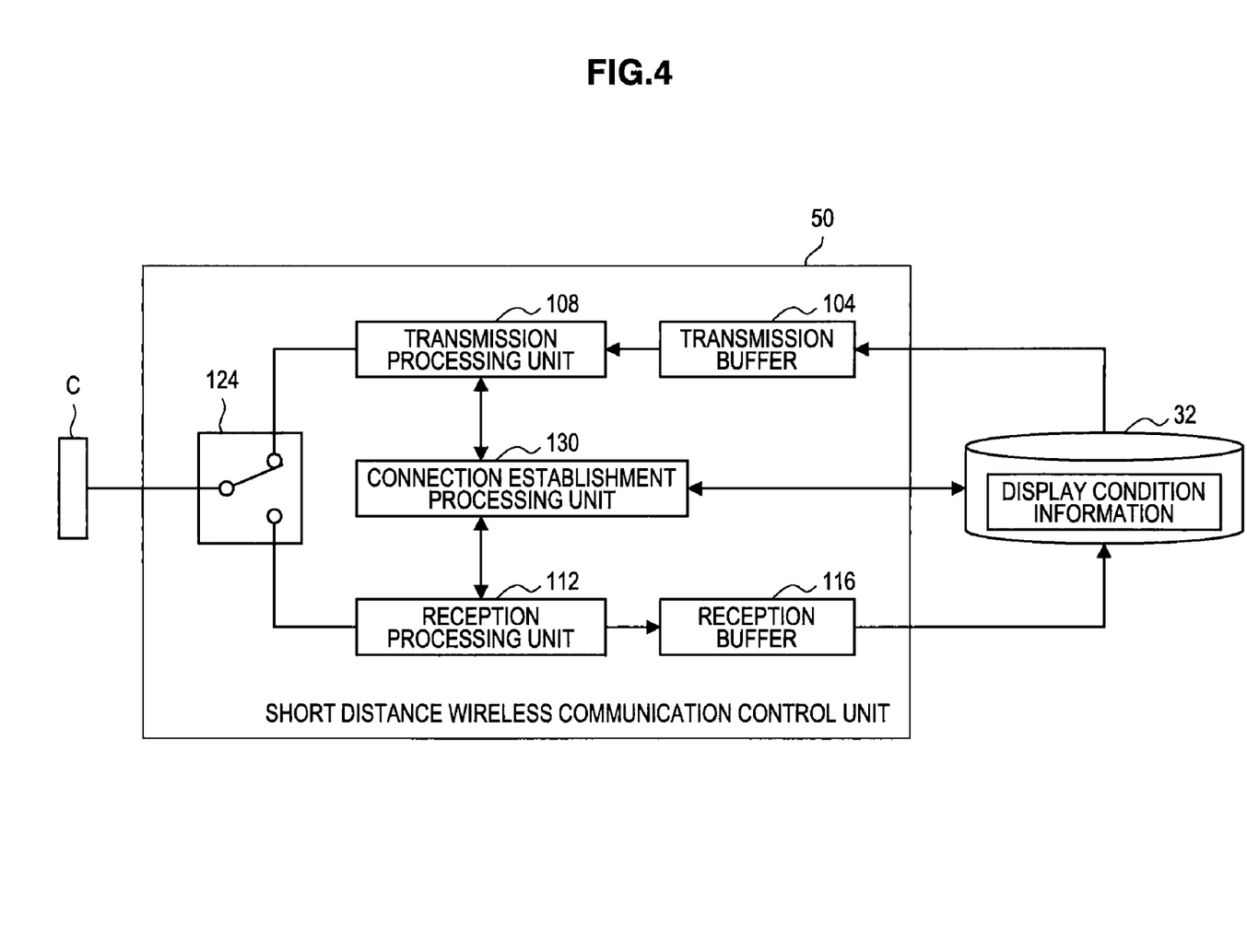
FIG. 4 is a functional block diagram showing a configuration of a short distance wireless communication control unit.

FIG. 4 is a functional block diagram showing a configuration of the short distance wireless communication control unit 50. As shown in FIG. 4, the short distance wireless communication control unit 50 includes a transmission buffer 104, a transmission processing unit 108, a reception processing unit 112, a reception buffer 116, a selector 124 and a connection establishment processing unit 130.

The transmission buffer 104 is a storage medium for holding therein transfer data (transmission data) to be transferred from the electric field coupler C to another communication apparatus. The transfer data is provided from the storage unit 32, for example.

The transmission processing unit 108 performs a signal processing for converting transfer data input from the transmission buffer 104 or data for connection such as connection establishment request input from the connection establishment processing unit 130 into a signal form transmittable from the electric field coupler C.

The reception processing unit 112 performs decode processing on the data received by the electric field coupler C. For example, the reception processing unit 112 may down-convert the data received by the electric field coupler C as a high frequency signal into a baseband signal and obtain a bit string based on a constellation.

The reception buffer 116 is a storage medium for holding therein the data decoded by the reception processing unit 112. The data held in the reception buffer 116 is provided to the storage unit 32, for example.

The selector 124 selectively connects the electric field coupler C to either of the transmission processing unit 108 or the reception processing unit 112. More specifically, the electric field coupler C is connected to the transmission processing unit 108 by the selector 124 at the time of the transmission of the cell phone 20, and the electric field coupler C is connected to the reception processing unit 112 by the selector 124 at the time of the reception.

The connection establishment processing unit 130 performs connection establishment processing (connection establishment communication) necessary when a data communication is made between the cell phone 20 and another communication apparatus. For example, when the cell phone 20 functions as an initiator, the connection establishment processing unit 130 outputs a connection establishment request to the transmission processing unit 108 and transmits the connection establishment request from the electric field coupler C when the other communication apparatus and the electric field coupler C are brought close to each other.

Moreover, when the cell phone 20 functions as a responder, the connection establishment processing unit 130, when receiving a connection establishment request from another communication apparatus, judges whether the non-display instruction is set in the display condition information stored in the storage unit 32. When judging that the non-display instruction is set in the display condition information stored in the storage unit 32, the connection establishment processing unit 130 rejects the connection establishment request from such another communication apparatus and terminates the communication with such another communication apparatus.

On the other hand, when judging that the display instruction is set in the display condition information stored in the storage unit 32, the connection establishment processing unit 130 transmits an ACK in response to the connection establishment request to such another communication apparatus via the transmission processing unit 108. In addition, the connection establishment processing unit 130 may judge whether the non-display instruction or the low-power-consumption display instruction is set in the display condition information stored in the storage unit 32. In this case, when judging that the non-display instruction or the low-power-consumption display instruction is set in the display condition information stored in the storage unit 32, the connection establishment processing unit 130 may reject the connection establishment request from such another communication apparatus and terminate the communication with such another communication apparatus. Moreover, a series of communications including the transmission and reception of the connection establishment request and the ACK in this manner may be referred to as a connection establishment communication.

When receiving the ACK from the cell phone 20, such another communication apparatus can start a data transmission to the cell phone 20. Here, such another communication apparatus may transmit the data with the addition of the apparatus's own contact information and the current time. In this case, the cell phone 20 may correlate the received data with the contact information and current time added to the data to provide them to the storage unit 32. With such configuration, the cell phone 20 can know per received data when and from whom the data was transmitted.

[3-3] Operation of Cell Phone

The function of the cell phone 20 according to the present embodiment has been described hereinabove with reference to FIG. 3 to FIG. 4. Subsequently, a communication method performed in the cell phone 20 according to the present embodiment will be described with reference to FIG. 5.

<Operation Example>

Figure 5:
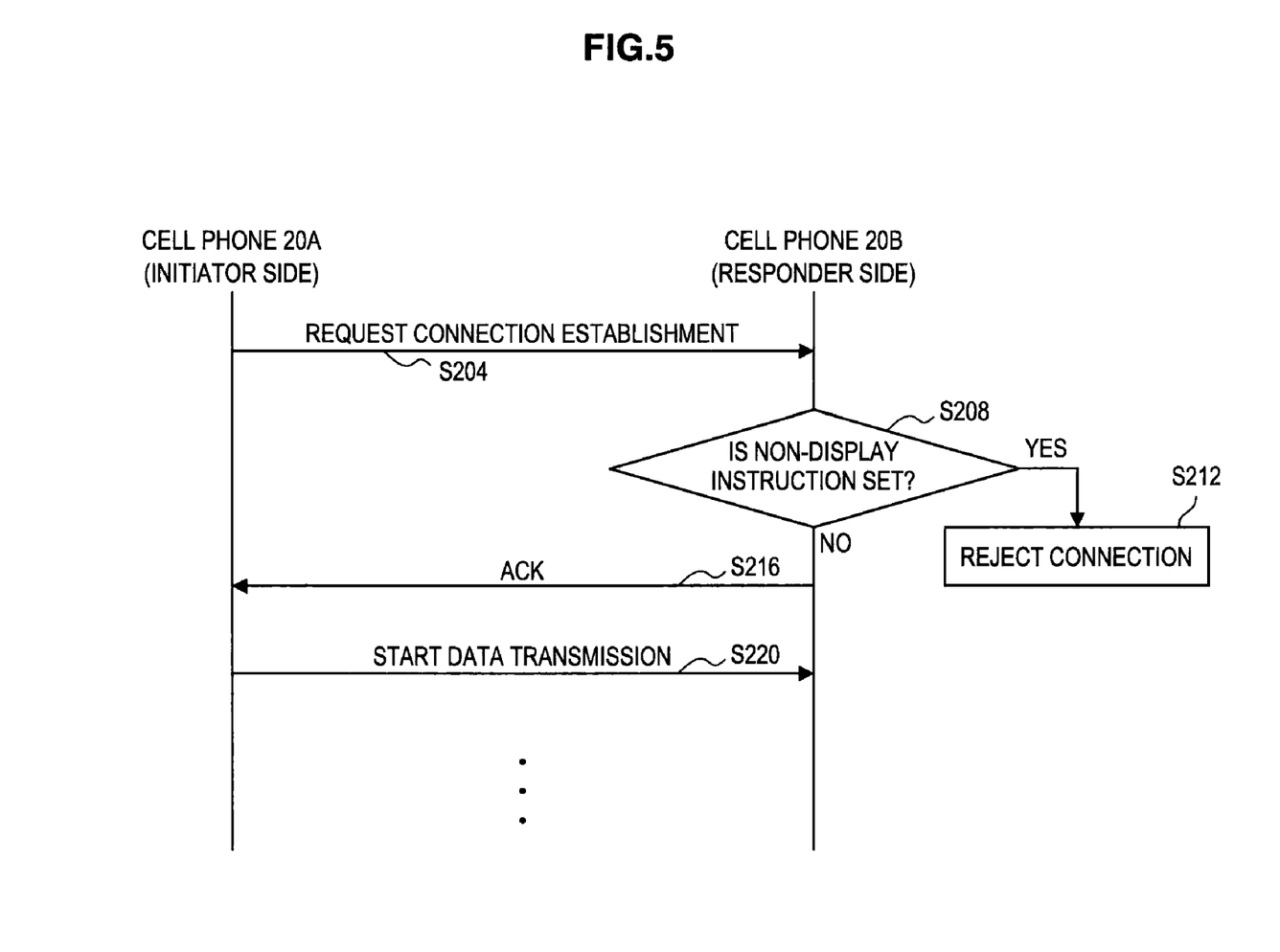
FIG. 5 is a sequence diagram showing a flow of an operation example of the cell phone according to the present embodiment.

FIG. 5 is a sequence diagram showing a flow of an operation example of the cell phone 20 according to the present embodiment. At first, as shown in FIG. 5, the cell phone 20A functioning as an initiator, when brought close to the cell phone 20B functioning as a responder, transmits a connection establishment request (S204). The connection establishment processing unit 130 of the cell phone 20B judges whether the non-display instruction is set in the display condition information stored in the storage unit 32 (S208).

Then, when judging that the non-display instruction is set in the display condition information stored in the storage unit 32 ("YES" at S208), the connection establishment processing unit 130 of the cell phone 20B rejects the connection establishment request from the cell phone 20A (S212). That is, the connection establishment processing unit 130 of the cell phone 20B terminates the communication with the cell phone 20A. In addition, when rejecting the connection establishment request from the cell phone 20A, the connection establishment processing unit 130 of the cell phone 20B may transmit a response to that effect from the transmission processing unit 108.

On the other hand, when judging that the display instruction is set in the display condition information stored in the storage unit 32 ("NO" at S208), the connection establishment processing unit 130 of the cell phone 20B transmits an ACK in response to the connection establishment request from the transmission processing unit 108 to the cell phone 20A (S216). When receiving the ACK from the cell phone 20B, the cell phone 20A starts a data transmission to the cell phone 20B (S220).

As described above, with the operation example of the cell phone 20 according to the present embodiment, the time when the cell phone 20B functioning as a responder is communicable with another communication apparatus can be limited to when the display instruction is set in the display condition information stored in the storage unit 32 of the cell phone 20A. Accordingly, it can be prevented that, without a user of the cell phone 20B knowing it, data is sent from a communication apparatus of a third party to the cell phone 20B or data of the cell phone 20B is stolen by a communication apparatus of a third party.

[4] Conclusion

As described above, the cell phone 20 according to the present embodiment can limit the data communication by the short distance wireless communication to a case where the display instruction is set in the display condition information stored in the storage unit 32 of the cell phone 20A. Accordingly, even when a communication apparatus of a third party is brought close to the cell phone 20 in a crowded train, for example, the cell phone 20 can be prevented from receiving data (e.g., advertisement data unrequired by the user or harmful data) from the communication apparatus of the third party. Similarly, according to the present embodiment, it can be prevented that data of the cell phone 20 is obtained by the communication apparatus of the third party, without the user of the cell phone 20 knowing it.

Moreover, in the present embodiment, it is possible to restrict the communication party by the short distance wireless communication based on the information of whether the display processing is performed by the display unit 36 originally held by the cell phone 20. That is, with the present embodiment, since it is only necessary to use the information of whether the display processing is performed by the display unit 36 for restricting the communication party, the development cost can be reduced when a function of restricting the communication party is newly added to the cell phone 20.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

Moreover, the example in which data is transmitted from the cell phone 20 functioning as an initiator has been described in "[3-3] Operation of cell phone" but the present invention is not limited thereto. For example, the cell phone 20B functioning as a responder shown in FIG. 5 may start data transmission to the cell phone 20A after the transmission of the ACK at S216.

Moreover, each step in the processing of the cell phone 20 in the present specification does not necessarily be processed in a time-series manner along the order described as the sequence diagram. For example, each step in the processing of the cell phone 20 may include a processing performed in parallel or separately (e.g., parallel processing or processing by an object).

Moreover, it is also possible to create a computer program for causing hardware such as the CPU 201, the ROM 202 and RAM 203 built into the cell phone 20 to provide a similar function as each configuration of the cell phone 20 described above. Furthermore, a storage medium containing the computer program can be also provided. Furthermore, the series of processing can be realized in hardware by configuring the respective function blocks illustrated in the functional block diagrams in FIG. 3 and FIG. 4 in hardware.

The present application contains subject matter related to that disclosed in Japanese Priority Patent Application JP 2009-001157 filed in the Japan Patent Office on Jan. 6, 2009, the entire content of which is hereby incorporated by reference.

What is claimed is:

1. A communication apparatus comprising:
a display unit;
a storage unit capable of storing therein display condition information in which a display instruction for causing the display unit to perform display processing or a non-display instruction for not allowing the display unit to perform the display processing is set;
a display control unit for causing the display unit to perform the display processing when the display instruction is set in the display condition information stored in the storage unit and for not allowing the display unit to perform the display processing when the non-display instruction is set in the display condition information; and
a communication control unit for controlling a connection establishment communication with a communication party by a communication system based on electric field coupling or magnetic field coupling and data communication with the communication party by the communication system,
wherein
when receiving signals transmitted from the communication party at the time of the connection establishment communication, the communication control unit judges whether the non-display instruction is set in the display condition information stored in the storage unit, and when judging that the non-display instruction is set, the communication control unit does not make the data communication with the communication party.

2. The communication apparatus according to claim 1, wherein
in the display condition information, there is set any one of the display instruction, the non-display instruction, and a low-power-consumption display instruction for causing display processing in low power consumption mode using less power than that consumed in the display processing when the display instruction is set,
the display control unit, when the low-power-consumption display instruction is set in the display condition information stored in the storage unit, causes the display unit to perform the display processing in the low power consumption mode, and
the communication control unit judges whether the non-display instruction or the low-power-consumption display instruction is set in the display condition information stored in the storage unit, and when judging that the non-display instruction or the low-power-consumption display instruction is set, the communication control unit does not make the data communication with the communication party.

3. The communication apparatus according to claim 1, further comprising:
an operation unit capable of receiving input of a display suspension instruction for suspending the display processing or a display restart instruction for restarting the display processing; and
a display condition switch unit for setting the non-display instruction in the display condition information stored in the storage unit when the operation unit receives input of the display suspension instruction, and for setting the display instruction for the display condition information stored in the storage unit when the operation unit receives input of the display restart instruction.

4. The communication apparatus according to claim 3, wherein
the storage unit further stores therein a threshold value, and
the display condition switch unit measures an elapsed time since the last time the operation unit received the input of operation information from a user, and sets the non-display instruction in the display condition information stored in the storage unit when the elapsed time exceeds the threshold value.

5. A communication method executed by a communication control unit of a communication apparatus including
a display unit,
a storage unit capable of storing therein display condition information in which a display instruction for causing the display unit to perform display processing or a non-display instruction for not allowing the display unit to perform the display processing is set,
a display control unit for causing the display unit to perform the display processing when the display instruction is set in the display condition information stored in the storage unit and for not allowing the display unit to perform the display processing when the non-display instruction is set in the display condition information; and
the communication control unit for controlling a connection establishment communication with a communication party by a communication system based on electric field coupling or magnetic field coupling and data communication with the communication party by the communication system,
comprising the steps of:
receiving signals transmitted from the communication party at the time of the connection establishment communication;
judging whether the non-display instruction is set in the display condition information stored in the storage unit; and
not making the data communication with the communication party when judging that the non-display instruction is set.

6. A nontransitory computer-readable storage medium encoded with a computer program, which when executed by a computer, causes the computer to perform a process comprising:
storing display condition information in which a display instruction for causing a display unit to perform display processing or a non-display instruction for not allowing the display unit to perform the display processing is set;
causing the display unit to perform the display processing when the display instruction is set in the display condition information and for not allowing the display unit to perform the display processing when the non-display instruction is set in the display condition information;
controlling a connection establishment communication with a communication party by a communication system based on electric field coupling or magnetic field coupling and data communication with the communication party by the communication system; and
judging, when receiving signals transmitted from the communication party at the time of the connection establishment communication, whether the non-display instruction is set in the display condition information, and when judging that the non-display instruction is set, not making the data communication with the communication party.

7. A communication system comprising:
a first communication apparatus including
a display unit;
a storage unit capable of storing therein display condition information in which a display instruction for causing the display unit to perform display processing or a non-display instruction for not allowing the display unit to perform the display processing is set;
a display control unit for causing the display unit to perform the display processing when the display instruction is set in the display condition information stored in the storage unit and for not allowing the display unit to perform the display processing when the non-display instruction is set in the display condition information; and
a communication control unit for controlling a connection establishment communication by a communication system based on electric field coupling or magnetic field coupling and data communication by the communication system; and
a second communication apparatus for transmitting signals at the time of the connection establishment communication,
wherein
when receiving signals transmitted from the second communication apparatus at the time of the connection establishment communication, the communication control unit judges whether the non-display instruction is set in the display condition information stored in the storage unit, and when judging that the non-display instruction is set, the communication control unit does not make the data communication with the second communication apparatus.

* * * * *